US006639742B2

(12) United States Patent
Snively et al.

(10) Patent No.: US 6,639,742 B2
(45) Date of Patent: Oct. 28, 2003

(54) APPARATUS AND METHODS FOR MOUNTING AN OPTICAL ELEMENT IN AN OPTICAL SYSTEM

(75) Inventors: David M. Snively, Cincinnati, OH (US); Doug M. Reinert, Amelia, OH (US); Kathleen E. Allen, Crescent Springs, KY (US); Ronald R. VanOverloop, West Chester, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/231,533

(22) Filed: Aug. 30, 2002

(65) Prior Publication Data

US 2003/0043476 A1 Mar. 6, 2003

Related U.S. Application Data

(60) Provisional application No. 60/316,192, filed on Aug. 30, 2001.

(51) Int. Cl.[7] .................................................. G02B 7/02
(52) U.S. Cl. ........................................................ 359/819
(58) Field of Search ................................ 359/811, 819, 359/640

(56) References Cited

U.S. PATENT DOCUMENTS

| 6,091,554 A | 7/2000 | Sharp et al. ................ 359/819 |
| 6,437,929 B1 * | 8/2002 | Liu ............................. 359/819 |
| 6,441,976 B1 | 8/2002 | Okorocha .................... 359/820 |

* cited by examiner

Primary Examiner—Ricky Mack (57) ABSTRACT

Apparatus and methods for mounting an optical element to a mounting plate in an optical system. The optical element is adhesively bonded with a surface on the mounting plate by a radiation-curable adhesive and a radiation-transmissive member that provides an unobstructed optical path in the mounting plate for curing the radiation-curable adhesive. The adhesive accommodates differences in thermal expansion between the material forming the mounting plate and the material forming the optical element so as to maintain the position and angular orientation of the optical element relative to the mounting plate and so as to prevent damage to the optical element. The formulation of the adhesive forming the adhesive couplings may incorporate spacer elements operative for maintaining the spacing and parallelism between the optical element and the mounting plate.

36 Claims, 7 Drawing Sheets

APPARATUS AND METHODS FOR MOUNTING AN OPTICAL ELEMENT IN AN OPTICAL SYSTEM

CROSS-REFERENCE TO RELATED APPLICATIONS

This application claims the benefit of U.S. Provisional Application No. 60/316,192 filed on Aug. 30, 2001, the disclosure of which is hereby incorporated by reference herein in its entirety.

FIELD OF THE INVENTION

The present invention relates generally to the mounting of optical elements and, more particularly, to apparatus and methods for establishing and maintaining a secure, aligned attachment between an optical element and a mounting plate of an optical system.

BACKGROUND OF THE INVENTION

The performance of optical systems, such as a light engine for a conventional projection image display system, is sensitive to the mounting and alignment of the constituent optical elements. Typically, the optical system incorporates multiple optical components or elements that are each aligned with one or more optical axes. A positional misalignment of one optical element of only a few microns ($\mu$m) or a rotational misalignment of one optical element by a few tenths of an angular degree suffices to degrade one or more attributes of the image transmitted by the optical system.

Once aligned, the optical elements of an optical system must be held securely to resist shock, vibration and thermal stress due to transit, storage and operating environment. Due to various deficiencies in conventional apparatus and methods for coupling optical elements with mounting plates or mounting pads on a mounting plate, the alignment of an optical element established during assembly of the optical system may be subsequently lost. Relatively large changes in temperature may cause a conventionally-mounted optical element to change its translational position and/or angular orientation with respect to its mounting plate and with respect to other optical elements in the optical system. Because the precise positioning and alignment of the optical elements is crucial to the effective performance of the optical system, any thermally-induced displacement or rotation of the individual optical elements degrades the performance of the optical system as a whole. In extreme instances, thermally-induced movement relative to the mounting plate can actually cause physical damage to the optical element.

One conventional mounting method entails adhesively bonding an optical element, typically glass, to a mounting pad on a mounting plate formed of, for example, a metal. Room temperature curing of the adhesive is a protracted process which may take as long as seventy-two hours to achieve a full cure. The curing may be significantly accelerated by heating the adhesive to an elevated temperature. Although the curing time is reduced by heating, the time for the adhesive to fully cure remains on the order of hours. Therefore, curing the adhesive coupling the optical element with the mounting plate slows the throughput of the assembly process for the optical system. As the curing temperature is increased to accelerate curing for speeding the assembly throughput, it becomes more likely that the optical element may be damaged by the heat treatment. In addition, the expense of the assembly process is significantly increased because curing ovens must be purchased to perform the heat treatment. Moreover, the curing ovens occupy valuable floorspace in the assembly area for the optical system.

To reduce the curing time, a radiation-curable adhesive may be used for adhesively bonding the optical element to the mounting pad on the mounting plate. Conventional radiation-curable adhesives are usually cured with radiation from the ultraviolet portion of the electromagnetic spectrum, which is transmitted through the optical element to radiate the underlying adhesive. However, transmitting the curing radiation through the optical element to the adhesive presents a significant risk of causing irreversible damage to the optical element from either heating or ultraviolet exposure.

Thus, there is a need for apparatus and methods for mounting an optical element to a mounting plate such that the optical element is secured to the mounting plate for resisting shock, vibration and thermal stress arising from transit, storage and operating environment and such that the mounting operation does not damage the optical element.

SUMMARY OF THE INVENTION

The present invention overcomes the foregoing and other shortcomings and drawbacks of mounting optical elements in an optical system, such as optical elements that are mounted to mounting plates as components of a light engine in a projection image display system. According to the principles of the invention, an optical assembly is provided that includes a mounting plate having a front surface, an opposed rear surface, and a throughhole extending between the rear surface and the front surface. The optical assembly further includes an optical element positionable adjacent to the front surface so as to block the throughhole, a radiation-transmissive member, such as a circular disk, obstructing at least a portion of the throughhole, and a first quantity of radiation-curable adhesive securing the radiation-transmissive member to the optical element. The first quantity of radiation-curable adhesive is capable of being cured by radiation incident from the rear surface of the mounting plate and transmitted through the radiation-transmissive member. The radiation used to cure the first quantity of radiation-curable adhesive is not transmitted through the optical element to effect curing.

In an alternative embodiment of the invention, the optical assembly may further include a second quantity of radiation-curable adhesive securing the radiation-transmissive member to the mounting plate. The second quantity of radiation-curable adhesive is capable of being cured by radiation incident from at least one of the rear surface or the front surface of the mounting plate. The radiation used to cure the second quantity of radiation-curable adhesive is not transmitted through the optical element to effect curing.

According to the principles of the invention, an optical assembly is provided that includes a mounting plate having a front surface, an rear surface opposite the front surface, and one circular throughhole and one oval throughhole each extending between the rear surface and the front surface. The oval throughhole has a major axis aligned substantially with a center of the circular throughhole and a minor axis orthogonal to the major axis. The optical assembly further includes an optical element coupled with the mounting plate such that the optical element is movable relative to the mounting plate. A first circular member is positioned within the circular throughhole and is adhesively secured to the optical element and to the mounting plate. Positioned within the oval throughhole is a second circular member which is adhesively secured only to the optical element. The second circular member has a diameter substantially equal to a width of the oval throughhole along the minor axis. The second circular member and the oval throughbore cooperate to constrain movement of the optical element to a direction substantially parallel to the major axis.

According to the principles of the invention, a method is provided for assembling an optical element with a mounting plate. The method includes providing the mounting plate with a throughhole, positioning the optical element adjacent to a front side of the mounting plate such that a portion of the optical element blocks an entrance to the throughhole, placing a radiation-transmissive member such that at least a portion of the throughhole is obstructed, supplying a first quantity of radiation-curable adhesive between the radiation-transmissive member and the optical element, and exposing the first quantity of radiation-curable adhesive to radiation from a rear side of the mounting plate through the radiation-transmissive member to irradiate the first quantity of radiation-curable adhesive. The radiation is effective to adhesively secure the radiation-transmissive member with the optical element.

In an alternative embodiment of the invention, the method may further include supplying a second quantity of radiation-curable adhesive between the radiation-transmissive member and the mounting plate and exposing the second quantity of radiation-curable adhesive to radiation effective to adhesively secure the radiation-transmissive member with the mounting plate.

The invention permits an optical element of an optical system, such as an optical element of a light engine for use in a projection screen display, to be precisely mounted and cured in position, thereby controlling the motion of the optical element during transit, storage and operation. In an optical system such as a light engine that combines multiple image components to form a composite image, the microscopic pixel size of the individual image components, which may vary considerably but may be as small as about 10 $\mu$m, demands mounting techniques that maintain precise alignment during operation. A displacement in one of the individual image components by a distance equal to a fraction of the pixel size suffices to degrade the quality of the image output by the optical system.

According to the principles of the invention, adhesive couplings between the optical element and a mounting plate prevent misalignment and misorientation of the optical element during operation of the optical system resulting from, for example, differential thermal expansion arising from mismatches in coefficient of thermal expansion between the optical element and mounting plate. The flexibility of the adhesive layers between the optical element and the mounting plate accommodates the differential thermal expansion while maintaining the optical element substantially stationary and angularly oriented. As a result, the location of the optical element is controlled during operation of the optical system and the optical element is less likely to become misaligned or misoriented due to thermal effects. In addition, differential thermal expansion is significantly less likely to harm or otherwise damage the surface of the optical element. The principles of the invention are also effective for reducing the susceptibility of the mounted optical element to shock and vibration.

According to the principles of the invention, the curing time of the adhesive layers is significantly hastened by the use of radiation-curable adhesive. In addition, the use of a radiation-transmissive member permits direct irradiation of the radiation-curable adhesive in a direct optical path from the side of the mounting plate opposite to the optical element being adhesively secured thereto. As a result, the radiation-curable adhesive is not irradiated through the optical element being mounted, which significantly reduces or eliminates the risk of damage to the optical element from the curing radiation. Specifically, backside irradiation reduces the transfer of heat to the optical element and, in particular, curing with ultraviolet radiation from the backside is less likely to degrade the optical element. Moreover, the spatial tolerances and parallelism between at least the optical element and the radiation-transmissive member may be maintained by spacer elements in the radiation-curable adhesive.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE PREFERRED EMBODIMENT

Although the invention will be described next in connection with certain embodiments, the invention is not limited to practice in any one specific type of optical system. It is contemplated that the invention can be used with a variety of optical systems, including but not limited to optical systems for projection screen displays. The description of the invention is intended to cover all alternatives, modifications, and equivalent arrangements as may be included within the spirit and scope of the invention as defined by the appended claims. In particular, those skilled in the art will recognize that the components of the invention described herein could be arranged in multiple different ways.

Figure 1:
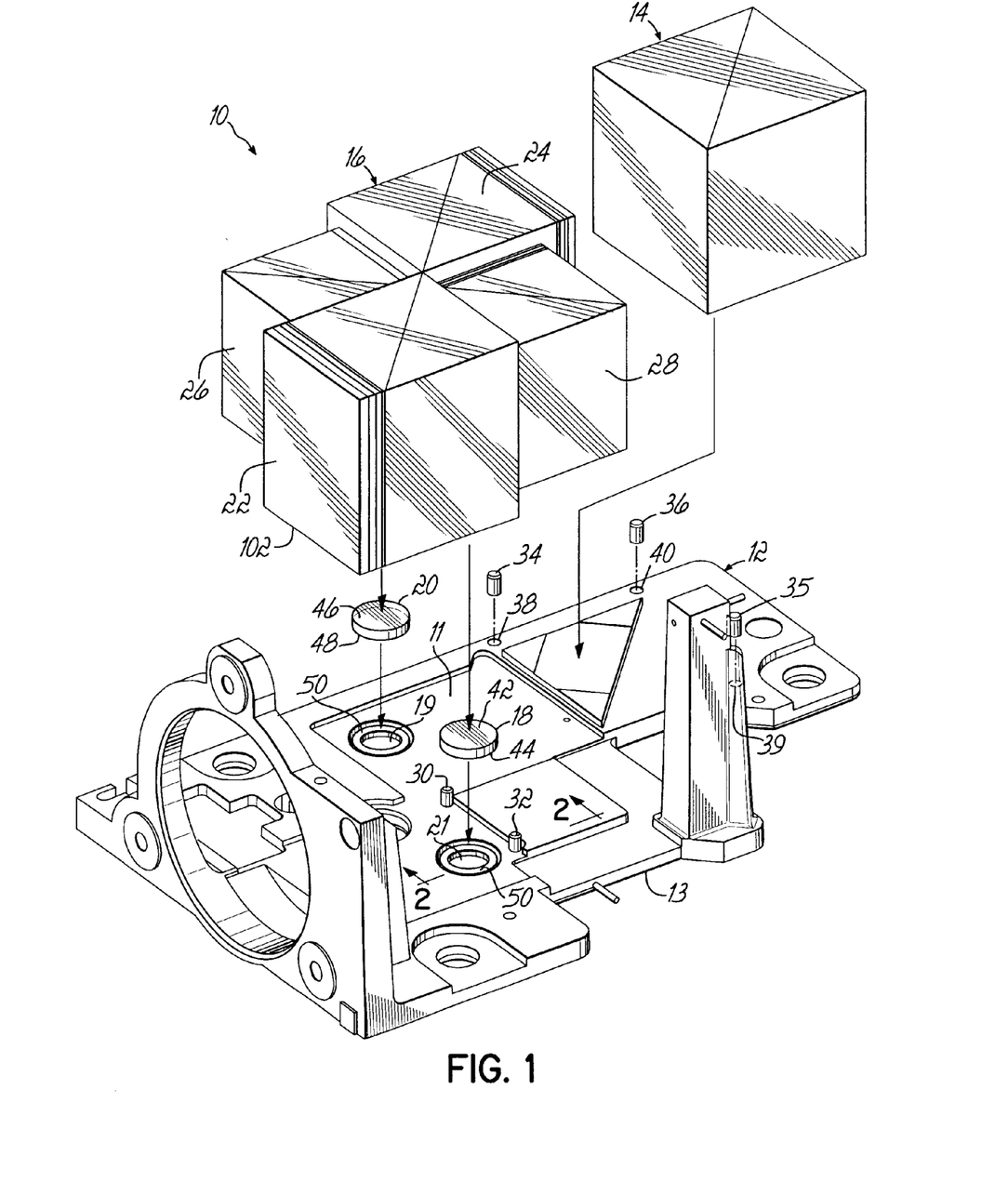
FIG. 1 is an exploded, perspective view of an assembly of an optical element and mounting plate according to the principles of the invention.
Figure 3:
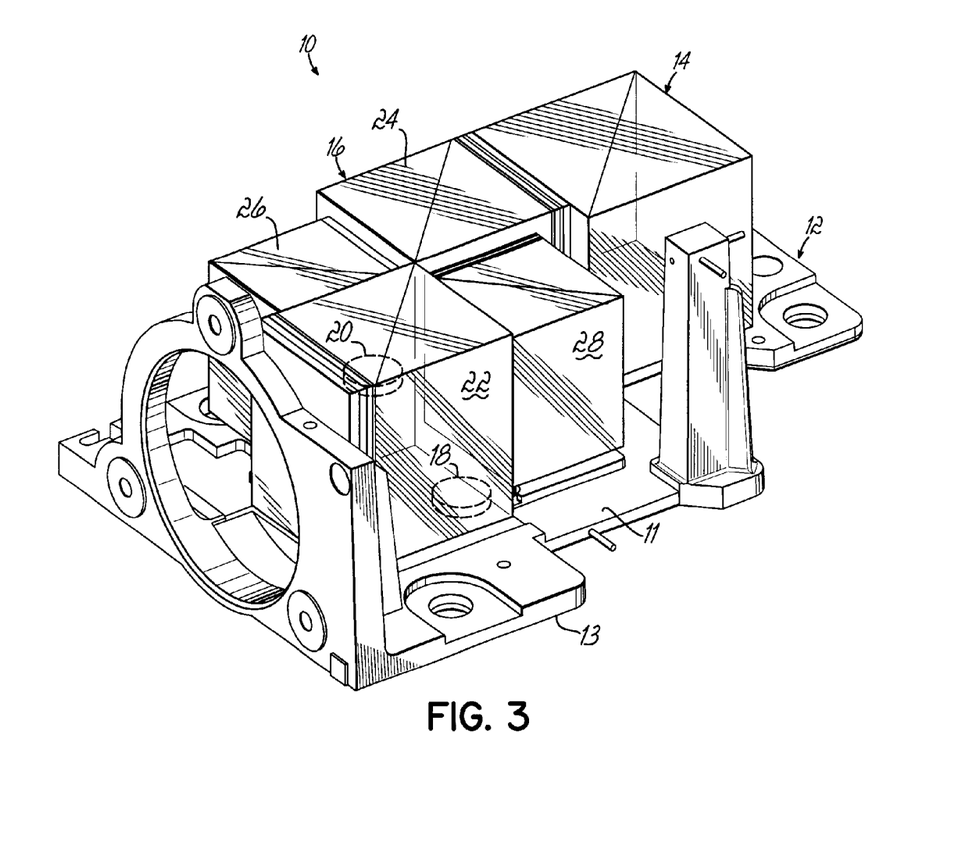
FIG. 3 is an assembled, perspective view of the optical element and mounting plate of FIG. 1.

With reference to FIGS. 1 and 3, an optical assembly 10 for an optical system (not shown) includes a mounting plate 12 having a front surface or side 11 and a back surface or side 13, an optical element 14 mounted to the front side 11 of mounting plate 12, an optical element 16 also mounted to the front side 11 of mounting plate 12, and a pair of radiation-transmissive members or disks 18, 20 each received in a corresponding one of a pair of throughholes 19, 21. Fundamental to the operation of the optical assembly 10 is the ability to precisely align the optical elements 14, 16 relative to an optical axis of the optical system and to maintain that alignment for resisting shock, vibration and thermal stress during transit, storage and operation. Typically, the optical elements 14, 16 are formed of a glass and the mounting plate 12 is formed of a metal, such as aluminum, an aluminum alloy, magnesium or stainless steel. Alternatively, the mounting plate 12 may also be formed from a thermoplastic resin, a thermosetting resin, or a ceramic material possibly with metallic mounting pad inserts provided therein for attachment of optical elements 14, 16.

Optical elements 14, 16 are any optical component or part, such as lenses, prisms, mirrors, filters, imagers, and the like, and are considered to also include assemblies of multiple optical parts, such as multiple prisms assembled together. As illustrated in FIGS. 1 and 3, optical element 16 is a quad-prism assembly including two prisms 22, 24 that are similarly dimensioned and a pair of prisms 26, 28 having smaller rectangular dimensions. The prisms 22, 24, 26, 28 are assembled so that the opposite upper and lower faces of prisms 26, 28 are recessed below respective planes containing the opposite upper and lower faces of prisms 22, 24. Optical element 14 is illustrated in FIGS. 1 and 3 as a polarizing beamsplitter that divides an incident beam of light into two individual polarized beams and provides one of the polarized beams to an adjacent side face of prism 24 of optical element 16. The optical assembly 10 may be, for example, a component of a light engine utilized to generate a stream of full-color images for viewing on a large-area rear projection television.

With continued reference to FIGS. 1 and 3, provided on the mounting plate 12 is a plurality of, for example, two locating pins 30, 32 that serve as registration guides for the translational and rotational positioning of optical element 16 relative to the mounting plate 12. The locating pins 30, 32 are aligned with individual locations along a transverse axis substantially parallel to the boundary between prism 22 and prism 28 of the optical element 16. When the optical element 16 is in a substantially contacting relationship with mounting plate 12, locating pin 30 is positioned at a recessed corner created by the intersection of prisms 22, 24, located beneath prism 28, which is approximately collinear with a vertical axis intersecting the centroid of the optical element 16. The spacing of locating pin 30 along the transverse axis from locating pin 32 prevents relative rotation between mounting plate 12 and optical element 16. The positioning of the locating pins 30, 32 reduces force concentrations applied to the optical element 16 during assembly. Similarly, a plurality of, for example, three locating pins 34, 35, 36 provided adjacent to the optical element 14 serve as positioning guides during assembly to the mounting plate 12. Locating pins 34, 35, 36 are removable from the assembly by withdrawal through a corresponding one of three clearance holes 38, 39, 40 extending through the thickness of the mounting plate 12. It is contemplated by the invention that locating pins 30, 32 may be removable from the assembled structure of the optical assembly 10 in a manner similar to locating pins 34, 35, 36 or may be permanent fixtures retained in optical assembly 10 as illustrated in FIG. 1.

The radiation-transmissive disks 18, 20 facilitate mounting of the optical element 16 to the mounting plate 12 by adhesive bonding. Radiation-transmissive disks 18, 20 are made of any material capable of transmitting incident radiation of at least one wavelength or a band of wavelengths, which may span all or a portion of the visible electromagnetic spectrum or the ultraviolet electromagnetic spectrum. For example, radiation-transmissive materials suitable for forming the disks 18, 20 include, but are not limited to, glass, acrylic, polycarbonate, and styrene. In one specific embodiment, the material forming radiation-transmissive disks 18, 20 transmits ultraviolet radiation of a single wavelength or a band of wavelengths without substantial absorption or blocking. An exemplary ultraviolet-transmissive material suitable for use in the invention is BK-7 borosilicate optical glass having an ultraviolet transmission exceeding 98% at a wavelength of 365 nm. Disk 18 has a front face 42 and an opposite rear face 44 separated by a thickness of the radiation-transmissive material. Similarly, disk 20 has a front face 46 and an opposite rear face 48 also separated by a thickness of the radiation-transmissive material. Radiation-transmissive disks 18, 20 may be piano lenses in which the opposite faces 42, 44 of disk 18 are planar and parallel and the opposite faces 46, 48 of disk 20 are also planar and parallel, although the invention is not so limited in that disks 18, 20 may take various different geometrical shapes and forms.

Figure 2A:
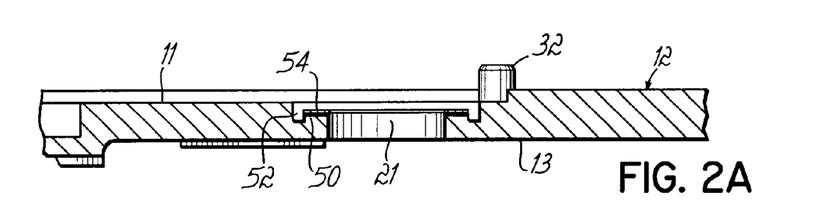
FIG. 2A–2E are cross-sectional views taken generally along line 2—2 of FIG. 1 diagrammatically illustrating the mounting of the optical element to the mounting plate.

With reference to FIG. 2A, extending about a circumference of throughhole 21 is an annular shoulder 50 that is recessed below the front side 11 of the mounting plate 12 and extending concentrically in a radial direction relative to the vertical center axis of throughhole 21. The annular shoulder 50 provides an upwardly-facing, annular mounting surface that engages an outer annular peripheral rim of the rear face 44 of the radiation-transmissive disk 18. To that end, the inner radial dimension of the annular shoulder 50 is lesser than the radial dimension of the radiation-transmissive disk 18 and provides a secure vertical position stop for disk 18. The outer radial dimension of the portion of the throughhole 21 between the annular shoulder 50 and the front side 11 of the mounting plate 12 is slightly larger than the radial dimension of the radiation-transmissive disk 18 for limiting the lateral travel of disk 18 when disk 18 is disposed in the throughhole 21. Concentrically encircling the annular shoulder 50 is an annular recess 52 that operates as a relief space or receptacle for capturing any excess adhesive resulting from the mounting operation that mounts radiation-transmissive disk 18 to the mounting plate 12. The throughhole 21, the annular shoulder 50 and the recess 52 may be cast, molded or machined in mounting plate 12 by conventional techniques familiar to a person of ordinary skill in the art. It is appreciated that throughhole 19 includes an annular shoulder and recess identical to annular shoulder 50 and recess 52.

According to principles of the invention and with reference to FIGS. 2A–2E and 4, a mounting sequence is presented for attaching or mounting optical element 16 to mounting plate 12 by adhesive bonding. Although the following description pertains to radiation-transmissive disk 18, it is appreciated that the described mounting sequence is equally applicable to the use of radiation-transmissive disk 20 for mounting optical element 16 to mounting plate 12. In a typical operation for adhesively bonding optical element 16 to mounting plate 12, the mounting sequence employing radiation-transmissive disk 20 occurs concurrently with the mounting sequence using radiation-transmissive disk 18.

With reference to FIG. 2A, a layer of a primer 54 is applied to the upwardly-facing, annular shoulder 50 and cured. Primer layer 54 is any suitable material for promoting adhesion with the material forming the surface of the annular shoulder 50. Similarly and with reference to FIG. 2B, a layer of primer 56 is applied to an annulus of the rear face 44 of radiation-transmissive disk 18 and cured. Typically, the radial dimension of the primer layer 56 is less than or equal to the radial dimension of annular shoulder 50. Primer layer 56 is any suitable material for promoting adhesion with the material forming the surface of the radiation-transmissive disk 18. The primer layers 54, 56 promote adhesive bonding of the material forming radiation-transmissive disk 18 to the material forming annular shoulder 50.

Figure 2B:
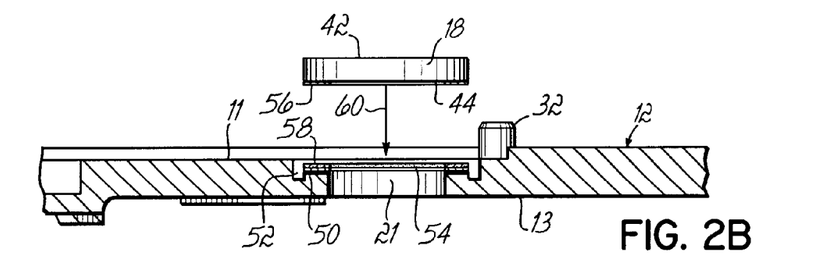

With continued reference to FIG. 2B, a quantity or layer 58 of an adhesive is applied to the primer layer 54 on annular shoulder 50, and the radiation-transmissive disk 18 is inserted in the direction indicated generally by arrow 60 into the entrance of the throughhole 21 proximate the front side 11 of the mounting plate 12 such that primer layer 56 contacts the adhesive layer 58. The front face 42 of radiation-transmissive disk 18 projects above the front side 11 of the mounting plate 12. Radiation-transmissive disk 18 obstructs at least a portion of the throughhole 21 and, typically, covers or occludes the throughhole 21, although the invention is not so limited. The adhesive of adhesive layer 58 may be any adhesive or bonding agent, preferably radiation-curable but not so limited, having properties suitable for use in the invention. Specifically, the adhesive layer 58 has a formulation selected to adhesively bond the disk 18 to the annular shoulder 50 and, typically, a formulation selected to adhesively bond glass to a metal, such as aluminum. The formulation of adhesive layer 58 is also selected to have a flexibility sufficient to accommodate thermal expansion differences between the material forming the annular shoulder 50 and the material forming the disk 18, as it is appreciated that these two materials have mismatched coefficients of thermal expansion that would otherwise, if not compensated, induce stresses in the adhesive bond during periods of operational heating.

Figure 2C:
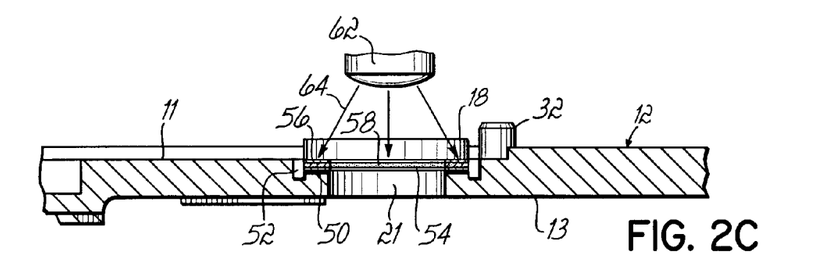

With reference to FIG. 2C, adhesive layer 58, if radiation curable, is irradiated with radiation effective to cure the adhesive in layer 58. To that end, an outlet of a light source 62 is positioned adjacent to the front side 11 of mounting plate 12. Light source 62 is operative to direct radiation, indicated diagrammatically by arrows 64, toward the front face 42 (FIG. 2B) of radiation-transmissive disk 18. The radiation 64 passes through the thickness of radiation-transmissive disk 18 and emerges from rear face 44 so as to illuminate the adhesive layer 58. The adhesive layer 58 is exposed to the radiation 64 for a duration, typically less than about 30 seconds, and at a wavelength or a band of wavelengths effective to promote curing to a final bond. The final bond of the cured adhesive layer 58 secures the radiation-transmissive disk 18 to the upwardly-facing mounting surface of shoulder 50. It is appreciated that, in certain embodiments, a conventional timed curing operation may replace the curing operation of FIG. 2C. However, curing adhesive layer 58 with radiation 64 from light source 62 reduces the time required to complete the mounting sequence.

Figure 2D:
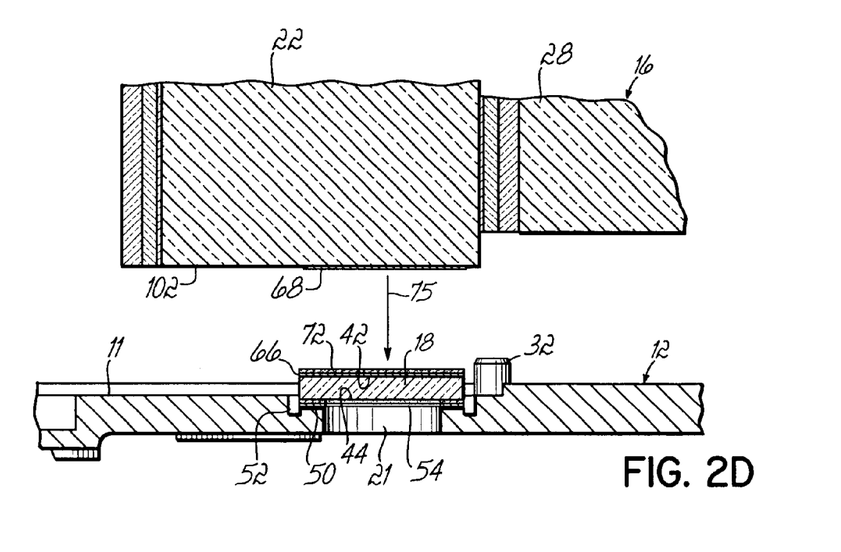

With reference to FIG. 2D, a layer of a primer 66 is applied to the front face 42 of radiation-transmissive disk 18 and cured. Primer layer 66 is any suitable material for activating and sealing the material forming the front face 42 of the radiation-transmissive disk 18 so as to promote an adhesive bond. Similarly, a layer of primer 68, typically disk-shaped, is applied to a bottom surface 102 of prism 22 of optical element 16 and cured. Primer layer 68 is any suitable material for promoting an adhesive bond with the material forming the surface of prism 22.

With continued reference to FIG. 2D, a quantity or layer 72 of an adhesive is applied to the front face 42 of disk 18 and the bottom surface 102 of prism 22 is brought into proximity with the front face 42 of disk 18. The adhesive of adhesive layer 72 may be any radiation-curable adhesive having properties suitable for use in the invention. Specifically, the adhesive layer 72 has a formulation selected to adhesively bond the prism 22 with disk 18 and, typically, a formulation selected to adhesively bond glass to glass. The formulation of adhesive layer 72 is also selected to have a flexibility sufficient to accommodate any thermal expansion differences between the material forming the prism 22 and the material forming the disk 18, as it is appreciated that these two materials could have mismatched coefficients of thermal expansion that would otherwise, if not compensated by the flexibility of adhesive layer 72, induce stresses in the bond during periods of operational heating.

Figure 4:
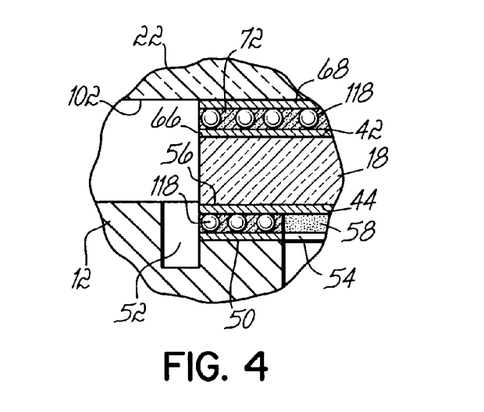
FIG. 4 is an enlarged view of a portion of the assembled optical element and mounting plate of FIG. 2E.

As best shown in FIG. 4, incorporated with a uniform distribution into the formulation of the adhesive layers 58 and 72 is a concentration of spacer elements 118. The concentration of the spacer elements 118 may be less than about 1.0 wt. % of the total weight of the formulation and is typically about 0.5 wt. %. After the adhesive layer 58 is cured, the spacer elements 118 are incompressible and operate to maintain a constant spacing between the upwardly-facing, annular shoulder 50 and the rear face 44 of the radiation-transmissive disk 18 and to maintain the rear face 44 approximately parallel with the mounting surface presented by the upwardly-facing, annular shoulder 50. Similarly, after the adhesive layer 72 is cured, the spacer elements 118 maintain a constant spacing between the bottom surface 102 of optical element 16 and the front face 42 of disk 18 and also maintain the front face 42 of disk 18 approximately parallel with the bottom surface 102 of optical element 16. The nominal diameter of the spacer elements 118 determines the spacing between the upwardly-facing mounting surface of the annular shoulder 50 and the rear face 44 of the radiation-transmissive disk 18 and between the bottom surface 102 of optical element 16 and the front face 42 of the radiation-transmissive disk 18.

The spacer elements 118 mixed with the adhesive layers 58 and 72 may have a uniform maximum dimension that is typically determined by the results of a thermal expansion calculation that predicts a maximum expansion for the components of the optical assembly 10. A typical maximum dimension for the spacer elements 118 will be about three times the expected maximum thermal expansion indicated by such calculations. The spacer elements 118 may be formed from any material, such as a glass, resistant to significant dimensional change during the operation of the optical system incorporating optical assembly 10. Preferably, the material forming the spacer elements is radiation-transmissive in a wavelength range suitable for curing the adhesive in the adhesive layers 58 and 72. In a specific embodiment of the invention, the spacer elements 118 are glass spheroids or beads having a nominal diameter of about 75 μm. Spherical beads of soda-lime glass suitable for use in the invention are commercially available from Potters Industries (Valley Forge, Pa.) in various nominal diameters ranging from about 50 μm to about 100 μm.

With reference to FIG. 2D, optical element 16 is moved generally in the direction of arrow 75 to a position proximate to the mounting plate 12 and is aligned relative to one or more reference points or at least one optical axis of the optical system. The portion of the bottom surface 102 of prism 22 covered by the primer layer 68 is placed in a contacting relationship with the adhesive layer 72 and the adhesive layer 72 is exposed to radiation to affect a curing operation.

Figure 2E:
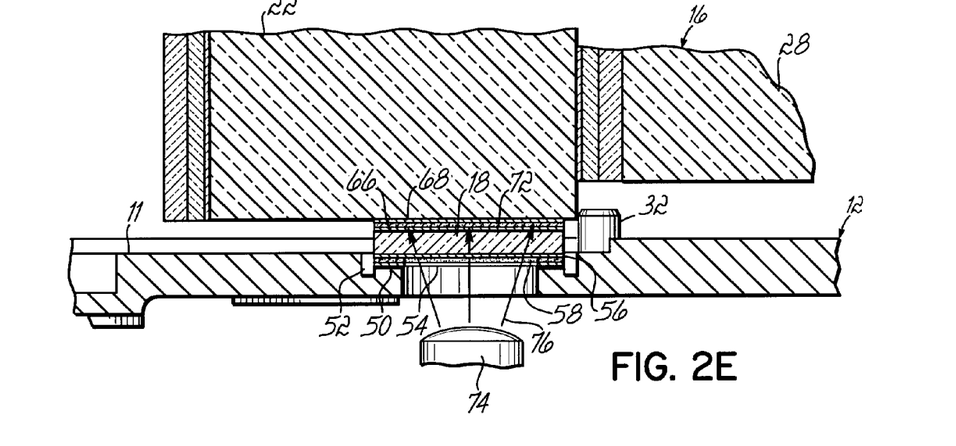

With reference to FIG. 2E, an outlet of a light source 74 is positioned adjacent to the rear side 13 of mounting plate 12. Light source 74 is operative to direct radiation, indicated diagrammatically by arrows 76, toward the entrance to throughhole 21 on the rear side 13 of mounting plate 12 for performing a curing operation. Radiation 76 passes through the thickness of the radiation-transmissive disk 18 from the rear face 44 to the front face 42 and illuminates the adhesive layer 72. The adhesive layer 72 is exposed to radiation 76 for a duration, typically on the order of less than about 30 seconds and at a wavelength or a band of wavelengths effective to promote curing to a final bond.

The final bond of the cured adhesive layer 72 secures the prism 22 of optical element 16 to the radiation-transmissive disk 18 and provides the assembled structure shown in FIG. 3. Adhesive layer 58 provides a first adhesive coupling between the radiation-transmissive disk 18 and the mounting plate 12. Adhesive layer 72 provides a second adhesive coupling between the radiation-transmissive disk 18 and the optical element 16. The adhesive layers 58 and 72 providing the first and the second adhesive couplings and the primer layers 54, 56, 66, 68 characterizing the final bonded state are best visualized with reference to FIG. 4. In a similar mounting sequence, prism 24 of optical element 16 is secured to mounting plate 12 by radiation-transmissive disk 20 and multiple radiation-curable adhesive layers and, optionally, primer layers. According to the principles of the invention, it is contemplated that the mounting sequence illustrated in FIGS. 2A–2E may rely upon a single radiation-transmissive disk and a single throughhole to mount an optical element.

The adhesive of adhesive layers 58 and 72 may be cured by exposure to ultraviolet radiation such as ultraviolet radiation, visible light, or both. It is appreciated that adhesive layers 58 and 72 may be adhesives of identical formulation or differing formulation. For example, the modulus of rigidity or stiffness of the adhesives forming the adhesive layers 58, 72 may be individually tailored to provide a custom rigidity or flexibility for each of the two adhesive junctions. For example, the adhesive layers 58, 72 may be tailored such that adhesive layer 72 has a higher modulus of rigidity than adhesive layer 58 and adhesive layer 58 has a greater flexibility. As a result of the reduced stiffness, the stresses acting on the bottom surface 102 of prism 22 are significantly lessened. It is contemplated that the formulations of the adhesives forming the adhesive layers 58, 72 may be tailored to accomplish other results, such as eliminating the need for primers or providing differing spacings for the two adhesive couplings by varying the nominal diameter of the spacer elements 118 in each.

The adhesive forming adhesive layers 58, 72 may take multiple different forms. For example, it is contemplated that the primer layers 54, 56 or primer layers 66, 68 may be omitted if the radiation-curable adhesive of adhesive layer 58 and/or adhesive layer 72 do not require a primer to assist in providing the associated adhesive bonds. Exemplary ultraviolet-curable adhesives in this classification include DESOBOND™ 956–106 optical adhesive commercially available from DSM Desotech (Elgin, Ill.) and OP-30 optical adhesive commercially available from Dymax Corporation (Torrington, Conn.).

In an alternative embodiment, the annular shoulder 50 of each throughhole 19, 21 and the radiation-transmissive disks 18, 20 may be configured such that the first adhesive coupling between the radiation-transmissive disk 18 and the mounting plate 12 is cured by irradiation from a light source, not shown but similar to light source 74, positioned adjacent to the rear side 13 of mounting plate 12. It is understood by persons of ordinary skill in the art that a radiation-transmissive disk (not shown), similar to disks 18, 20, and a throughhole (not shown), similar to throughholes 19, 21, could be provided in mounting plate 12 beneath optical element 14 for purposes of mounting optical element 14 to mounting plate 12 in a similar fashion to optical element 16, described herein.

Figure 5:
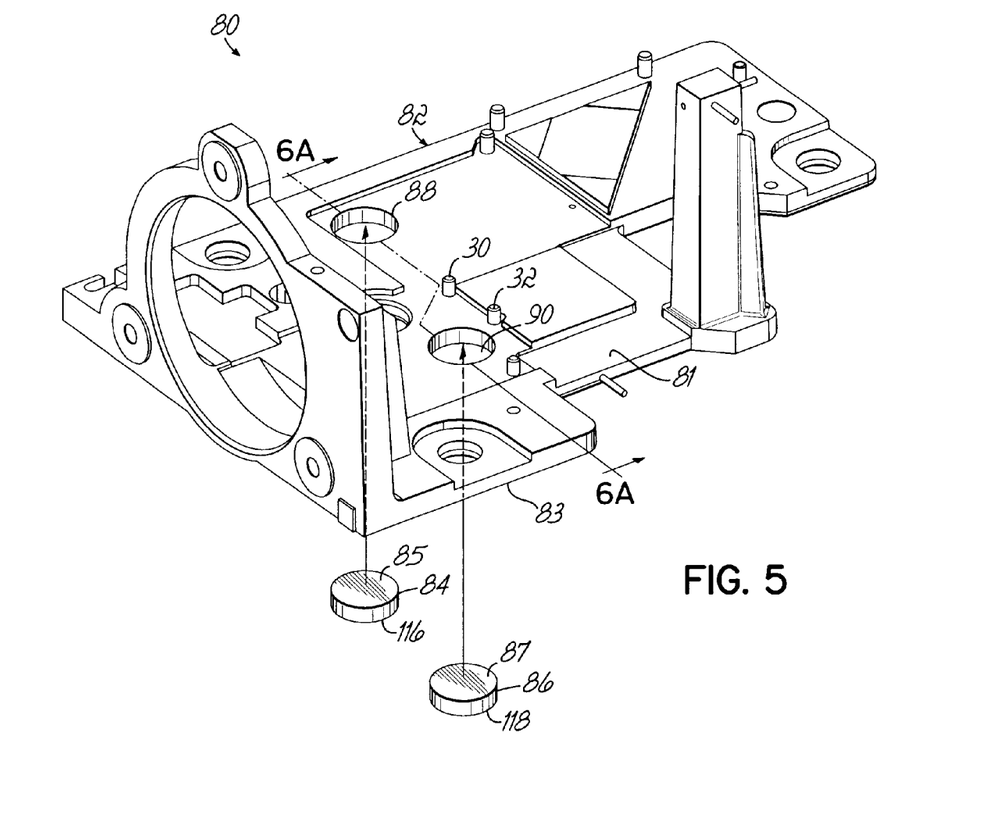
FIG. 5 is an exploded perspective view similar to FIG. 1, but with the optical element removed for clarity, diagrammatically illustrating an alternative embodiment of an assembly of an optical element with a mounting plate according to the principles of the invention.
Figure 6A:
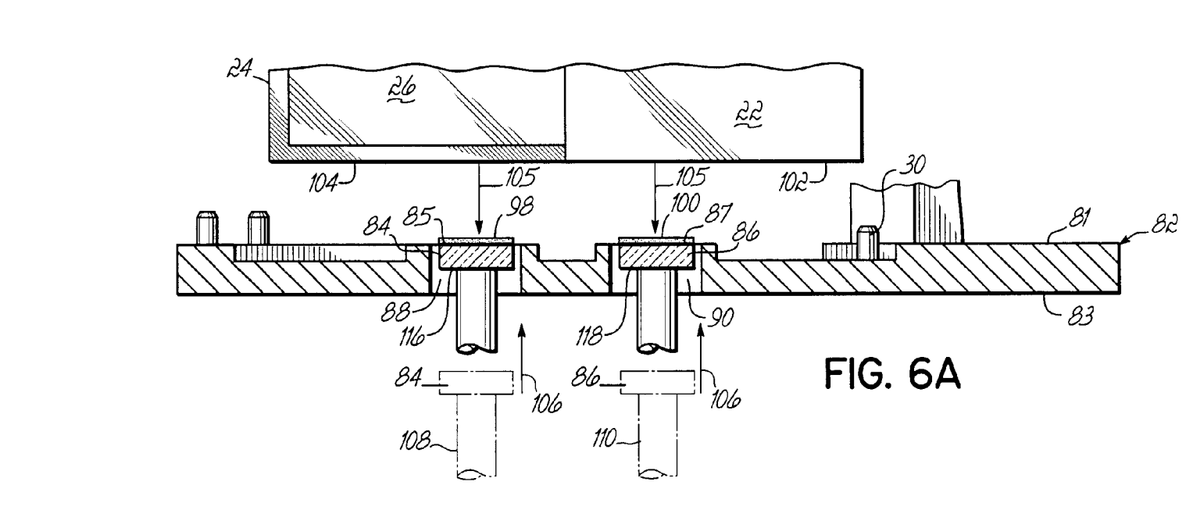
FIGS. 6A and 6B are cross-sectional views taken generally along line 6A—6A of FIG. 5 diagrammatically illustrating the mounting of the optical element to the mounting plate.
Figure 6B:
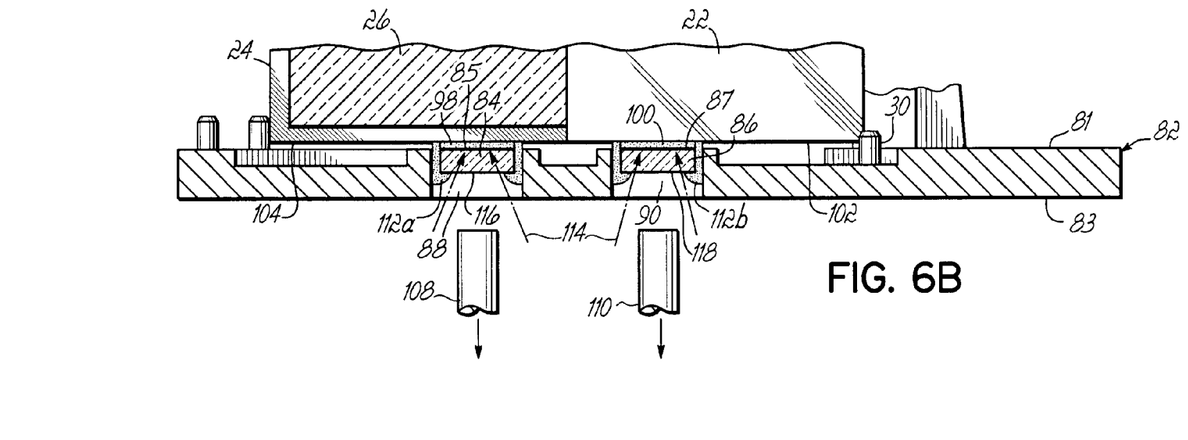

With reference to FIGS. 5 and 6A–6B in which like reference numerals refer to like features in FIGS. 1–4 and in an alternative embodiment of the invention, an optical assembly 80 for an optical system (not shown) includes a mounting plate 82 having a front surface or side 81 and a rear surface or side 83, the optical element 16 mounted to the front side 81 of mounting plate 82, and a pair of radiation-transmissive disks 84, 86. Provided with a spaced relationship in the mounting plate 82 are a circular first throughhole 88 and a circular second throughhole 90. Radiation-transmissive disk 84 is inserted into the first throughhole 88 and radiation transmissive disk 86 is inserted into the second throughhole 90. Radiation-transmissive disks 84, 86 each obstruct at least a portion of the corresponding one of the throughholes 88, 90 and may cover or occlude the respective one of the throughholes 88, 90. An upwardly-facing surface 85, 87, respectively, of each disk 84, 86 is adhesively bonded by a corresponding quantity or layer of a radiation-curable adhesive 98, 100 to a disk-shaped portion of a downwardly-facing planar surface 102, 104 on a corresponding one of prisms 22, 24, respectively. In addition, an outer circumference or margin of each disk 84, 86 may be adhesively bonded to a portion of the mounting plate 82 surrounding the periphery of the corresponding one of the throughholes 88, 90.

Disks 84, 86 may be formed of a material having a coefficient of thermal expansion differing from the coefficient of thermal expansion of the material forming the prisms 22, 24 of the optical element 16. For example, the disks 84, 86 may be formed of a glass that has a coefficient of thermal expansion less than or equal to the coefficient of thermal expansion of glass forming prisms 22, 24. As another example, disks 84, 86 may be formed of a polymer, such as acrylic, polycarbonate, or styrene, that has a coefficient of thermal expansion greater than the coefficient of thermal expansion of the glass forming prisms 22, 24. The materials forming the prisms 22, 24 and the disks 84, 86 typically have lower coefficients of thermal expansion than the material forming the mounting plate 82 so that, during periods of operational heating, the dimensional change of the mounting plate 82 is typically greater than the dimensional change of the prisms 22, 24 and disks 84, 86. The presence of the disks 84, 86 as an intermediate coupling element reduces the likelihood that the prisms 22, 24 will be damaged, misoriented, or misaligned relative to an optical axis of the optical system due to the larger relative expansion of the mounting plate 82 and forces acting on the prisms 22, 24 at the adhesively bonded points of attachment to the mounting plate 82. It is appreciated that if the mounting plate 12 is formed from a ceramic material, the coefficient of thermal expansion of the mounting plate 82 may be less than or equal to the coefficient of thermal expansion of the material forming the prisms 22, 24 and the disks 84, 86.

According to principles of the invention and with reference to FIGS. 6A–6B, a mounting sequence is presented for attaching or mounting optical element 16 to mounting plate 82. The optical element 16 is mounted to the mounting plate 82 using an adhesive that does not require a primer, as described herein. It is contemplated that primer layers (not shown) may be applied to a disk-shaped area on the bottom surface 102 of prism 22, an area of a bottom surface 104 of prism 24, and to the mounting plate 82 about each of the throughholes 88, 90, to which the corresponding one of the disks 84, 86 is to be inserted and attached, without departing from the spirit and scope of the invention. The material forming these primer layers may be identical to the material forming the corresponding ones of primer layers 54, 56, 66, 68 (FIGS. 1–4) and the adhesive of each of the adhesive layers 98, 100 is selected accordingly.

Optical element 16 is moved generally in the direction of arrows 105 toward the mounting plate 82 and is aligned relative to at least one optical axis or to another reference point. Respective quantities of radiation-curable adhesive are dispensed onto the upwardly-facing surface 85, 87 of each disk 84, 86, respectively, to provide the adhesive layers 98, 100. The disks 84, 86 are moved in the general direction of arrows 106 by respective arms 108, 110 of a mounting fixture into the throughholes 88, 90 and proximate to the respective proximate bottom surfaces 102, 104 of prisms 22, 24. Additional quantities of radiation-curable adhesive 112a, 112b may be introduced into the respective throughholes 88, 90 to wet and interconnect the adjacent surfaces of the corresponding one of the disks 84, 86 and the mounting plate 82. It is appreciated that the additional quantities of radiation-curable adhesive 112a, 112b may originate from the adhesive layers 98, 100.

With reference to FIG. 6B, the adhesive layers 98, 100 and the quantities of adhesive 112a, 112b are cured by exposure to radiation 114 from a suitable curing lamp (not shown). The radiation 114 is directed into the throughholes 88, 90 from the rear side 83 of the mounting plate 82 toward respective downwardly-facing surfaces 116, 118 of disks 84, 86. The radiation 114 penetrates through each of the disks 84, 86, typically without significant absorption or loss of intensity, and illuminates the corresponding one of the adhesive layers 98, 100. The exposure to radiation 114 is for a duration, typically on the order of about 1 second to about 30 seconds, and at a wavelength or a band of wavelengths, including but not limited to wavelengths characteristic of ultraviolet radiation and/or visible light, effective to promote curing of the adhesive layers 98, 100 to a final bond. Adhesive layers 98, 100 provide respective first adhesive couplings between the corresponding one of the radiation-transmissive disks 84, 86 and the optical element 16. The quantities of adhesive 112a, 112b provides respective second adhesive couplings between each of the radiation-transmissive disks 84, 86 and the mounting plate 82 about the inner peripheries of the respective throughholes 88, 90. According to the principles of the invention, it is contemplated that the mounting sequence illustrated in FIGS. 6A–6B may rely upon a single radiation-transmissive disk and a single throughhole to mount an optical element.

Figure 7:
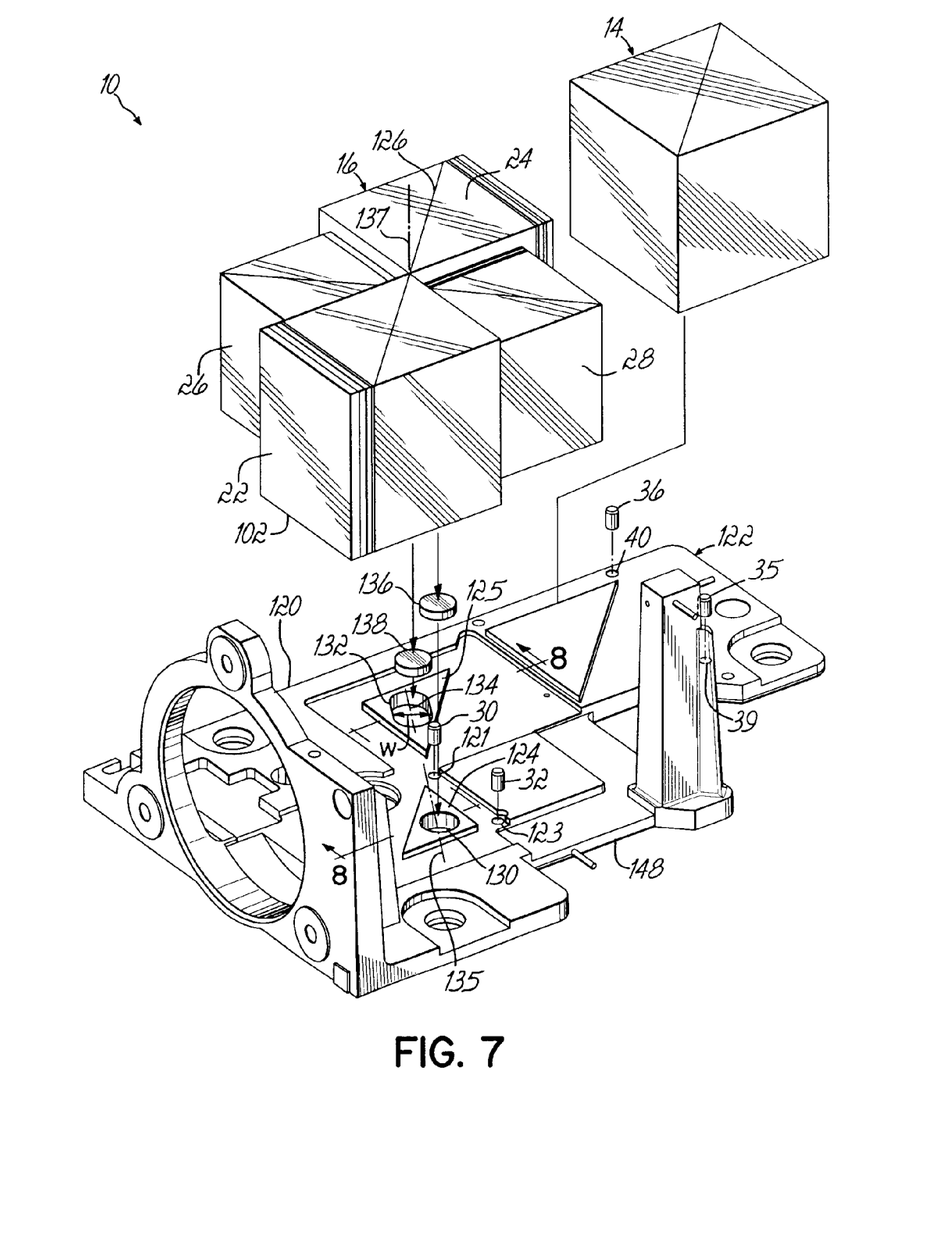
FIG. 7 is an exploded perspective view similar to FIG. 1 diagrammatically illustrating an alternative embodiment of an assembly of an optical element with a mounting plate according to the principles of the invention.
Figure 8:
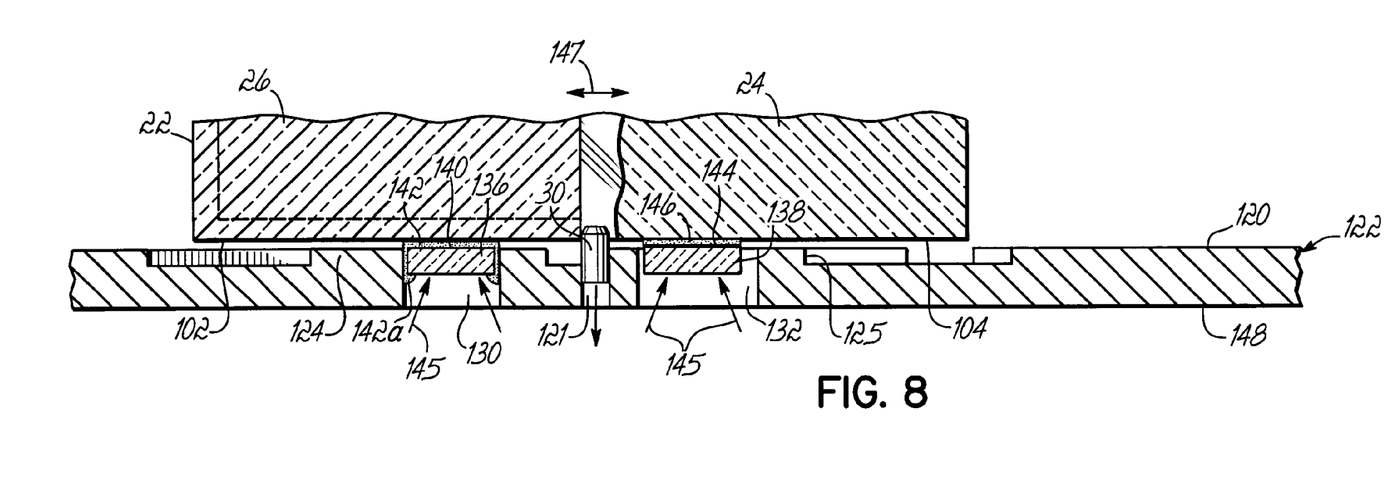
FIG. 8 is a cross-sectional view taken generally along line 8—8 of FIG. 7 diagrammatically illustrating the assembly of the optical element and the mounting plate.

With reference to FIGS. 7 and 8 in which like reference numerals refer to like features in FIGS. 1–4 and in an alternative embodiment of the invention, the optical element 16 is attached to a front surface or side 120 of a mounting plate 122 and supported by a pair of triangular pads 124, 125 integral with the mounting plate 122. The triangular pads 124, 125 are raised or elevated above surrounding areas of the mounting plate 122. The triangular pads 124, 125 are shaped as right triangles with approximately collinear hypotenuses, which are aligned approximately parallel with a plane 126 extending through a centerline of the optical element 16. Locating pins 30, 32 are removable by withdrawal, during the mounting sequence that mounts optical element 16 to mounting plate 122, through a corresponding one of clearance holes 121, 123 extending through the thickness of the mounting plate 122.

With continued reference to FIGS. 7 and 8, a circular throughhole 130 provided in triangular pad 124 extends through the thickness of the mounting plate 122. Also provided in triangular pad 125 and extending through the thickness of the mounting plate 122 is a slotted or oval throughhole 132. A major axis 134 of the oval throughhole 132 is aligned with the center of the circular throughhole 130. An imaginary line 135 connecting the major axis 134 with the center of circular throughhole 130 may intersect with a vertical imaginary line 137 passing through the center of mass of the optical element 16 so that the expansion of the optical element 16 is balanced about the vertical imaginary line 137. It is contemplated by the invention that the major axis 134 is not limited to being precisely aligned with the center of the circular throughhole 130 and, therefore, may be in substantially alignment to within an angular deviation of less than about 5° without departing from the spirit and scope of the invention. The oval throughhole 132 has a length measured along the major axis 134, a minor axis orthogonal to the major axis 134 at its centerpoint, and a width, w, measured along the minor axis at the centerpoint.

A radiation-transmissive member or disk 136 is positioned within the circular throughhole 130. A radiation-transmissive member or disk 138 is positioned within the oval throughhole 132 and has an outer diameter approximately equal to the width of oval throughhole 132. The clearance between the width of the oval throughhole 132 the outer diameter of radiation-transmissive disk 138 may be less than about 0.125 inches and, typically, is less than or equal to about 0.025 mm.

With continued reference to FIGS. 7 and 8, an upwardly-facing surface 140 of radiation-transmissive disk 136 is adhesively bonded by a corresponding layer of a radiation-curable adhesive 142 to a disk-shaped portion of the downwardly-facing planar surface 102 on prism 22. An adhesive quantity 142a also adhesively secures the radiation-transmissive disk 136 with the mounting plate 122 about the inner periphery of the circular throughhole 130. A layer of a radiation-curable adhesive 146 adhesively bonds an upwardly-facing surface 144 of radiation-transmissive disk 138 to a disk-shaped portion of downwardly-facing planar surface 104 on prism 24. However, radiation-transmissive disk 138 is not adhesively secured to mounting plate 122.

The adhesive in adhesive layers 142, 146 and adhesive quantity 142a is cured by exposure to visible and/or ultraviolet radiation 145 incident from the back side 148 of the mounting plate 122. The adhesive in adhesive layers 142, 146 and adhesive quantity 142a does not require a primer, as described herein. It is contemplated that primer layers (not shown) may be applied to a disk-shaped area on the bottom surface 102 of prism 22, an area of a bottom surface 104 of prism 24, and to the surfaces 140, 144 of radiation-transmissive disks 136, 138, respectively, without departing from the spirit and scope of the invention. The material forming these primer layers may be identical to the material forming the corresponding ones of primer layers 54, 56, 66, 68 (FIGS. 1–4) with the adhesive of each of the adhesive layers 142, 146 and adhesive quantity 142a being selected accordingly.

During a mounting sequence and with continued reference to FIGS. 7 and 8, the optical element 16 is aligned relative to one or more reference points, or at least one optical axis, of the optical system. Radiation-transmissive disk 136 is inserted from a rear surface or side 148 of mounting plate 122 using an arm of a mounting fixture (not shown) into the rearwardly-facing entrance of the circular throughhole 130. Similarly, radiation-transmissive disk 138 is inserted from the rear side 148 of mounting plate 122 using another arm of the mounting fixture into the rearwardly-facing entrance of the oval throughhole 132. The adhesive layers 142, 146 are dispensed onto surfaces 140, 144, either before or after insertion, and adhesive quantity 142a is provided between the radiation-transmissive disk 136 and the inner periphery of the circular throughhole 130. The adhesive in adhesive layers 142, 146 and in adhesive quantity 142a is cured by exposure to radiation 145 incident from the back side 148 of the mounting plate 122. The radiation 145 penetrates through the thickness of the radiation-transmissive disks 136, 138 to cause curing of the adhesive in adhesive layers 142, 146 and in adhesive quantity 142a. After curing is substantially complete, locating pins 30, 32 are withdrawn through clearance holes 121, 123.

According to the principles of the invention, oval throughhole 132 and radiation-transmissive disk 138 cooperate to constrain movement of the optical element 16 to a direction substantially parallel to the major axis 134. Movement arises from thermally-induced dimensional changes of the optical element 16 and the mounting plate 122 that occur during, for example, operation of the optical system of which mounting plate 122 and optical element 16 are components. The differential dimensional changes occur because the optical element 16 and mounting plate 122 have different coefficients of thermal expansion. The radiation-transmissive disks 136, 138 operate as locating elements for the optical element 16 relative to the mounting plate 122. Specifically, the oval throughhole 132 guides and constrains the movement of the radiation-transmissive disk 138 to be substantially parallel with the major axis 134 of the oval throughhole 132. As a result, the optical element 16 may translate parallel to the major axis 134, as indicated generally by the double-headed arrow labeled with reference numeral 147 (FIG. 8), when it expands. However, the radiation-transmissive disk 136 cannot move a significant amount in a direction along the minor axis and transverse to the major axis 134 of the oval throughhole 132. As a result, radiation-transmissive disk 136 cannot rotate within circular throughhole 130 such that optical element 16 is constrained against significant rotation relative to mounting plate 122. Typically, the movement of radiation-transmissive disk 136 within the oval throughhole 132 in a direction parallel to major axis 134 is limited to less than about 50 μm.

According to the principles of the invention, the ability to directly irradiate the radiation-curable adhesive with curing radiation dramatically improves the curing rate of the adhesive and, thereby, significantly reduces the time required to mount an optical element to a mounting plate compared with optical element mounting using conventional air curing adhesives. Specifically, the utilization of radiation-transmissive disks and corresponding throughholes in the mounting plate permits the curing to occur from a radiation source positioned adjacent to the back side of the mounting plate. As a result, the associated manufacturing process for the optical system has a significantly increased throughput. Furthermore, the radiation operating to cure the adhesive is not transmitted through the optical element because the radiation may be incident from the back side of the mounting plate and transferred through the thickness of each radiation-transmissive disk to cause curing of the adhesive. As a result, the optical element has a significantly reduced risk of incurring damage from the curing radiation. Specifically, backside irradiation reduces the transfer of heat to the optical element and, in particular, curing with ultraviolet radiation from the backside is less likely to degrade the optical element.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicants' general inventive concept.

Having described the invention, what is claimed is:

1. An optical assembly comprising:
    a mounting plate having a front surface, a rear surface opposite the front surface, and a throughhole extending between said rear surface and said front surface;
    an optical element positionable adjacent to said front surface so as to block said throughhole,
    a radiation-transmissive member obstructing at least a portion of said throughhole; and
    a first quantity of radiation-curable adhesive securing said radiation-transmissive member to said optical element, said first quantity of radiation-curable adhesive capable of being cured by radiation incident from said rear surface of said mounting plate, wherein the radiation is not transmitted through said optical element for curing said first quantity of radiation-curable adhesive.

2. The optical assembly of claim 1 further comprising a second quantity of radiation-curable adhesive securing said radiation-transmissive member to said mounting plate, said second quantity of radiation-curable adhesive capable of being cured by radiation incident from at least one of said rear surface and said front surface of said mounting plate.

3. The optical assembly of claim 2 wherein said first and said second quantities of radiation-curable adhesive have differing formulations.

4. The optical assembly of claim 3 wherein said first quantity of radiation-curable adhesive has a different stiffness than said second quantity of radiation-curable adhesive.

5. The optical assembly of claim 4 wherein said second quantity of radiation-curable adhesive has a greater stiffness than said first quantity of radiation-curable adhesive.

6. The optical assembly of claim 2 wherein said second quantity of radiation-curable adhesive further includes a plurality of spacer elements disposed between said radiation-transmissive member and said mounting plate.

7. The optical assembly of claim 6 wherein said spacer elements are glass spheriods each having a nominal diameter between about 50 μm and about 100 μm.

8. The optical assembly of claim 2 wherein said second quantity of radiation-curable adhesive is curable by exposure to at least one of ultraviolet radiation and visible light.

9. The optical assembly of claim 2 wherein said throughhole includes a mounting surface for said radiation-transmissive member, said mounting surface being secured with said radiation-transmissive member by said second quantity of radiation-curable adhesive.

10. The optical assembly of claim 9 wherein said radiation-transmissive member is a circular disk and said mounting surface is an annular shoulder positioned within said throughhole.

11. The optical assembly of claim 10 wherein said second quantity of radiation-curable adhesive further includes a plurality of spacer elements disposed between said radiation-transmissive member and said mounting surface of said mounting plate.

12. The optical assembly of claim 2 wherein the radiation is transmitted through said radiation-transmissive member for curing said second quantity of radiation-curable adhesive.

13. The optical assembly of claim 1 wherein said radiation-transmissive member is a circular disk and said throughhole has a circular cross-sectional profile with a diameter greater than a diameter of the circular disk.

14. The optical assembly of claim 1 wherein said first quantity of radiation-curable adhesive further includes a plurality of spacer elements disposed between said radiation-transmissive member and said optical element.

15. The optical assembly of claim 14 wherein said spacer elements are glass spheriods each having a nominal diameter between about 50 $\mu$m and about 100 $\mu$m.

16. The optical assembly of claim 1 wherein said first quantity of radiation-curable adhesive is curable by exposure to at least one of ultraviolet radiation and visible light.

17. The optical assembly of claim 1 wherein said radiation-transmissive member is formed of a material having a coefficient of thermal expansion differing from a coefficient of expansion of a material forming said optical element, and said mounting plate is formed of a material having a coefficient of thermal expansion differing from the material forming said optical element.

18. The optical assembly of claim 1 wherein said radiation-transmissive member is formed of a material selected from the group consisting of glass, acrylic, polycarbonate, and styrene.

19. An optical assembly comprising:
a mounting plate having a front surface, a rear surface opposite the front surface, a circular throughhole extending between said rear surface and said front surface, and an oval throughhole extending between said rear surface and said front surface, said oval throughhole having a major axis aligned substantially with a center of said circular throughhole and a minor axis orthogonal to said major axis;
an optical element coupled with said mounting plate such that said optical element is movable relative to said mounting plate;
a first circular member positioned within said circular throughhole, said first circular member having a first portion adhesively secured to said optical element and a second portion adhesively secured to said mounting plate;
a second circular member positioned within said oval throughhole and adhesively secured to said optical element, said second circular member having a diameter substantially equal to a width of said oval throughhole parallel to said minor axis, said second circular member and said oval throughbore cooperating to constrain movement of said optical element to a direction substantially parallel to said major axis.

20. The optical assembly of claim 19 wherein said optical element and said mounting plate have differing coefficients of thermal expansion, the movement of said optical element relative to said mounting plate arising from changes in temperature of the optical assembly.

21. The optical assembly of claim 19 wherein an imaginary line connecting said major axis with said center of said circular throughhole intersects with an imaginary line passing through a center of mass of said optical element.

22. A method of assembling an optical element with a mounting plate, comprising:
providing the mounting plate with a throughhole;
positioning the optical element adjacent to a front side of the mounting plate such that a portion of the optical element blocks an entrance to the throughhole;
placing a radiation-transmissive member such that at least a portion of the throughhole is obstructed;
supplying a first quantity of radiation-curable adhesive between the radiation-transmissive member and the optical element; and
exposing the first quantity of radiation-curable adhesive to radiation from a rear side of the mounting plate through the radiation-transmissive member to irradiate the first quantity of radiation-curable adhesive, the radiation being effective to adhesively secure the radiation-transmissive member with the optical element.

23. The method of claim 22 further comprising:
supplying a second quantity of radiation-curable adhesive between the radiation-transmissive member and the mounting plate; and
exposing the second quantity of radiation-curable adhesive to radiation effective to adhesively secure the radiation-transmissive member with the mounting plate.

24. The method of claim 23 wherein the exposing of the second quantity of radiation-curable adhesive further includes directing radiation through the radiation-transmissive member to irradiate the second quantity of radiation-curable adhesive.

25. The method of claim 24 wherein the radiation is directed from the front side of the mounting plate.

26. The method of claim 23 wherein the radiation-transmissive member transmits radiation having at least one of an ultraviolet wavelength and a visible wavelength, and the exposing of the second quantity of radiation-curable adhesive further comprises irradiating the second quantity of radiation-curable adhesive with radiation for a duration sufficient to provide the adhesive securement between the radiation-transmissive member and the optical element.

27. The method of claim 23 wherein the exposing of the second quantity of radiation-curable adhesive occurs before the exposing of the first quantity of radiation-curable adhesive.

28. The method of claim 27 wherein the duration of the irradiation is less than about 30 seconds.

29. The method of claim 23 further comprising aligning the optical element relative to an optical axis before exposing the first and second quantities of radiation-curable adhesive to radiation for effecting securement.

30. The method of claim 23 further comprising maintaining a spacing between the radiation-transmissive member and the mounting plate after exposing by incorporating spacer elements into the second quantity of radiation-curable adhesive.

31. The method of claim 23 further comprising maintaining a spacing between the optical element and the radiation-transmissive member after exposing by incorporating spacer elements into the first quantity of radiation-curable adhesive.

32. The method of claim 31 further comprising maintaining a spacing between the radiation-transmissive member and the mounting plate after exposing by incorporating spacer elements into the second quantity of radiation-curable adhesive.

33. The method of claim 22 wherein the radiation-transmissive member transmits radiation having at least one of an ultraviolet wavelength and a visible wavelength, and the exposing of the first quantity of radiation-curable adhesive further comprises irradiating the first quantity of radiation-curable adhesive with radiation for a duration sufficient to provide the adhesive securement between the radiation-transmissive member and the mounting plate.

34. The method of claim 33 wherein the duration of the irradiation is less than about 30 seconds.

35. The method of claim 22 further comprising aligning the optical element relative to an optical axis before exposing the first quantity of radiation-curable adhesive to radiation for effecting securement.

36. The method of claim 22 further comprising maintaining a spacing between the optical element and the radiation-transmissive member by incorporating spacer elements into the first quantity of radiation-curable adhesive.

* * * * *

UNITED STATES PATENT AND TRADEMARK OFFICE
CERTIFICATE OF CORRECTION

PATENT NO. : 6,639,742 B2
DATED : October 28, 2003
INVENTOR(S) : Snively, David M.

It is certified that error appears in the above-identified patent and that said Letters Patent is hereby corrected as shown below:

Column 2,
Line 54, delete "an" and insert -- a --.

Column 3,
Line 2, delete "throughbore" and insert -- throughhole --.

Column 4,
Line 27, delete "FIG." and insert -- FIGS. --.

Column 6,
Line 21, delete "piano" and insert -- plano --.

Column 9,
Line 4, delete "affect" and insert -- effect --.

Column 12,
Line 14, delete "135" and insert -- 137 --.
Line 21, delete "in substantially" and insert -- substantially in --.
Line 32, insert -- and -- following "132".

Column 14,
Line 26, delete "," and insert -- ; --.
Line 56, delete "spheriods" and insert -- spheroids --.

Column 15,
Line 20, delete "spheriods" and insert -- spheroids --.
Line 58, delete "throughbore" and insert -- throughhole --.

Signed and Sealed this

First Day of June, 2004

JON W. DUDAS
*Acting Director of the United States Patent and Trademark Office*